United States Patent [19]
Imaharu et al.

[11] Patent Number: 6,102,820
[45] Date of Patent: Aug. 15, 2000

[54] AUTO-TENSIONER

[75] Inventors: Hiroaki Imaharu; Hajime Nakayama; Hiromichi Suzuki, all of Wako, Japan

[73] Assignee: Honda Giken Kogyo Kabushiki Kaisha, Tokyo, Japan

[21] Appl. No.: 09/116,940

[22] Filed: Jul. 17, 1998

[30]     Foreign Application Priority Data

Jul. 24, 1997  [JP]  Japan .................................... 9-198838

[51] Int. Cl.⁷ ..................................................... F16H 7/12
[52] U.S. Cl. ........................... 474/135; 474/109; 474/133
[58] Field of Search ..................................... 474/135, 138, 474/113, 109, 133, 101, 136; 188/218, 78, 325

[56]         References Cited

U.S. PATENT DOCUMENTS

| | | | |
|---|---|---|---|
| 4,698,049 | 10/1987 | Bytzek et al. ........................... | 474/135 |
| 5,407,397 | 4/1995 | Foley ...................................... | 474/135 |
| 5,664,648 | 9/1997 | Hester .................................. | 188/218 R |
| 5,772,549 | 6/1998 | Berndt et al. ........................... | 474/135 |
| 5,795,257 | 8/1998 | Giese et al. .......................... | 474/135 X |

FOREIGN PATENT DOCUMENTS 7-286646  10/1995  Japan .

*Primary Examiner*—David A. Bucci
*Assistant Examiner*—Marcus Charles
*Attorney, Agent, or Firm*—Nikaido, Marmelstein, Murray & Oram LLP

[57]              ABSTRACT

An auto-tensioner that inhibits the generation of heat in an insert bearing made of a synthetic resin. An outer shell of an arm member is swingably supported on an inner shaft of a base member through an insert bearing made of a synthetic resin, and a tension pulley carried at a tip end of the arm member, is brought into pressure contact with an endless belt by biasing the arm member with a spring. By subjecting an inner surface of the outer shell in sliding contact with an outer peripheral surface of the insert bearing, to shot peening prior to assembly, the arithmetically averaged roughness Ra and the maximum height Ry of inner peripheral surface are regulated into ranges of $1 \times 10^{-6}$ m $\leq$ Ra $\leq 10 \times 10^{-6}$ m
Ry $\leq 60 \times 10^{-6}$ m.

4 Claims, 7 Drawing Sheets

AUTO-TENSIONER

BACKGROUND OF THE INVENTION

1. Field of the Invention

The present invention relates to an auto-tensioner for applying a predetermined tension to an endless belt or an endless chain by placing a rotor into resilient abutment against the endless belt or the endless chain.

2. Description of the Prior Art

An auto-tensioner is conventionally known, for example, from Japanese Patent Application Laid-Open No. 7-286646. The known auto-tensioner is designed so that an eccentric pulley support is swingably carried on an outer periphery of a cam shaft through a braking member made of a synthetic resin, and a pulley rotatably supported on an outer periphery of the pulley support, is brought into pressure contact with the endless belt by the resilient force of a spring. The action of the pulley support due to a variation in tension of the endless belt is inhibited by the friction force generated between the cam shaft and the pulley support by the braking member.

However, the above conventional auto-tensioner suffers from the problem that if the temperature of the braking member is raised by the friction heat generated by the sliding movement of the braking member on the pulley support, scorching, hardening, cracking or the like is produced, resulting in a reduction in durability of the auto-tensioner.

SUMMARY OF THE INVENTION

The present invention has been accomplished with the above circumstance in view, and it is an object of the present invention to suppress the generation of heat in the braking member made of a resin in the auto-tensioner.

To achieve the above object, according to the present invention, there is provided an auto-tensioner for applying tension to an endless transmitting band, comprising a base member having an inner shaft, a braking member formed of a resin and having a cylindrical shape which is fitted over an outer peripheral surface of the inner shaft. An arm member having an outer shell is fitted over an outer peripheral surface of the braking member, and a rotary member is mounted on the arm member. A resilient member biases the arm member in a direction to bring the rotary member into pressure contact with the endless transmitting band, the swinging movement of the arm member being damped by the friction force generated between the outer peripheral surface of the braking member and an inner peripheral surface of the outer shell. An arithmetically averaged roughness Ra and a maximum height Ry of the inner peripheral surface of the outer shell in sliding contact with the outer peripheral surface of the braking member, are set in ranges of $1 \times 10^{-6}$ m $\leq$ Ra $\leq 10 \times 10^{-6}$ m and Ry $\leq 60 \times 10^{-6}$ m.

With the above arrangement, the heat radiating effect can be enhanced by an increase in surface area of the inner peripheral surface of the outer shell prior to assembly, by regulating the surface roughness (the arithmetically averaged roughness Ra and a maximum height Ry) of the inner peripheral surface of the outer shell to a predetermined value. Thereafter, the resin of the braking member is allowed to enter the recess in the inner peripheral surface of the outer shell, thereby enabling the sliding characteristic to be enhanced. Thus, it is possible to inhibit the generation of heat due to the sliding movement between the inner peripheral surface of the outer shell and the outer peripheral surface of the braking member to prevent scorching, hardening and cracking of the braking member due to the raising of the temperature. According to another feature of the present invention, the braking member is made from a mixture which comprises at least one base material selected from 46-nylon and 66-nylon, at least one reinforcing material selected from a glass fiber, a carbon fiber and a KEVLAR (para-aramid) fiber, and at least one lubricating material selected from a fluorine containing resin and a molybdenum containing resin.

With the above feature, the sliding characteristic of the base material is further enhanced by incorporating the lubricating material selected from the fluorine containing resin and the molybdenum containing resin into the base material selected from 46-nylon and 66-nylon which provide an excellent sliding characteristic, but also the sliding characteristic of the outer shell is enhanced by the fact that the resin of the braking member enters the recess in the inner peripheral surface of the outer shell. Moreover, the strength of the base material can be enhanced by mixing the reinforcing material selected from glass fiber, carbon fiber, Kevlar fiber and the like.

According to a further feature of the present invention, the outer shell is made of an aluminum alloy, and the arithmetically averaged roughness Ra and the maximum height Ry are obtained by subjecting the inner peripheral surface of the outer shell to a shot peening. Thus, the surface roughness of the inner peripheral surface of the outer shell which are made of the aluminum alloy, can be simply regulated to a predetermined value.

According to still another feature of the present invention, there is provided an auto-tensioner for applying a tension to an endless transmitting band, comprising a base member having an inner shaft, a cylindrical shaped, braking member formed of a resin and fitted over an outer peripheral surface of the inner shaft, an arm member having an outer shell fitted over an outer peripheral surface of the braking member, and a rotary member mounted on the arm member. A resilient member biases the arm member in a direction to bring the rotary member into pressure contact with the endless transmitting band, the swinging movement of the arm member being damped by the friction force generated between the outer peripheral surface of the braking member and an inner peripheral surface of the outer shell. The inner surface of the outer shell which is in sliding contact with the outer peripheral surface of the braking member, is subjected to a shot peening.

With the above arrangement, the heat radiating effect can be enhanced by an increase in the surface area the in peripheral surface prior to assembly, by increasing the surface roughness degree of the inner peripheral surface of the outer shell by shot peening. Thereafter, the resin of the braking member is allowed to enter the recess in the inner peripheral surface of the outer shell, thereby enabling the sliding characteristic to be enhanced. Thus, it is possible to inhibit the generation of heat due to the sliding movement between the inner peripheral surface of the outer shell and the outer peripheral surface of the braking member, to prevent scorching, hardening and cracking of the braking member due to the rising temperature.

BRIEF DESCRIPTION OF THE DRAWINGS

The mode for carrying out the present invention will now described by way of an embodiment shown in the accompanying drawings.

DETAILED DESCRIPTION OF THE PREFERRED EMBODIMENT

Figure 1:
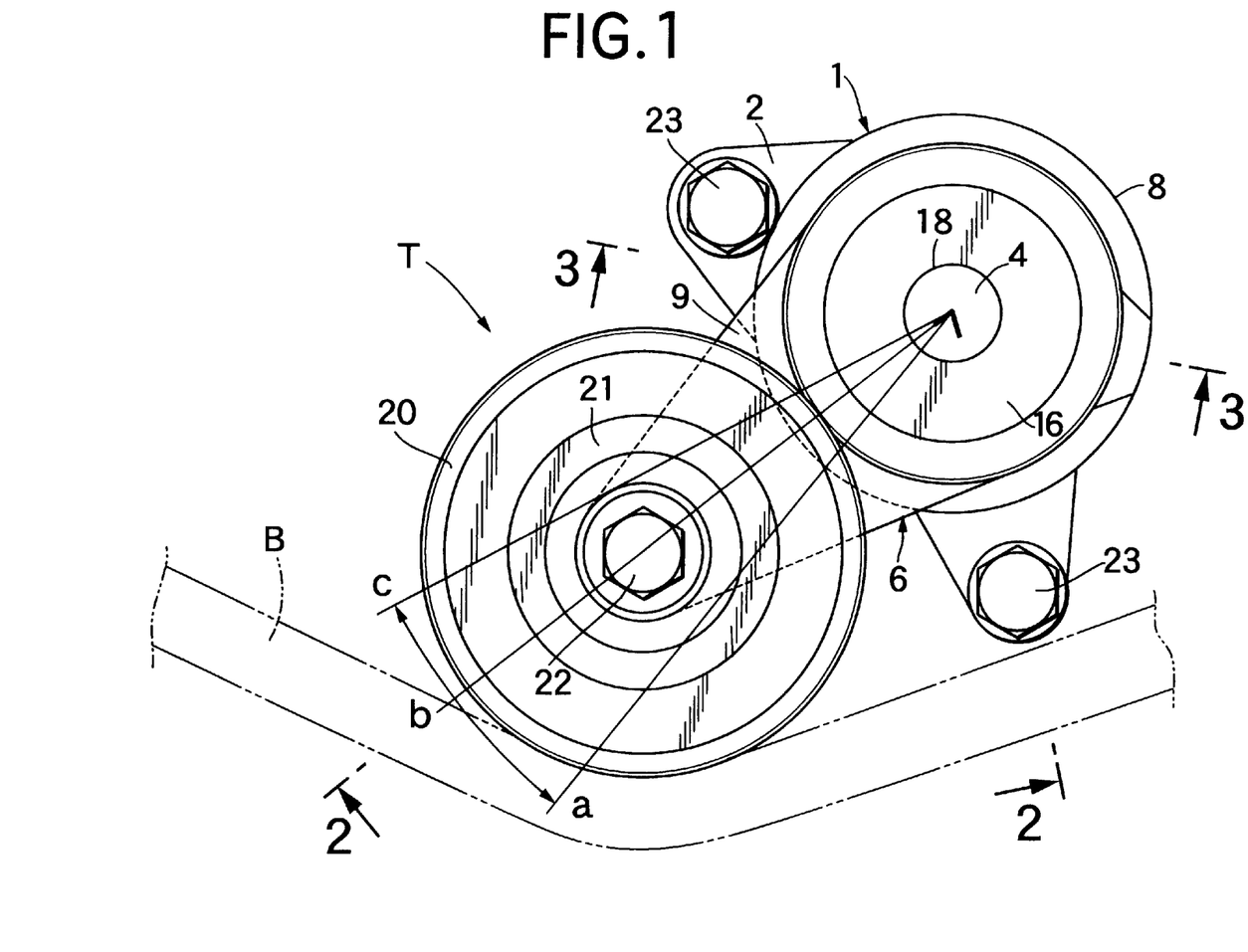
FIG. 1 is a plan view of an auto-tensioner of the present invention.
Figure 2:
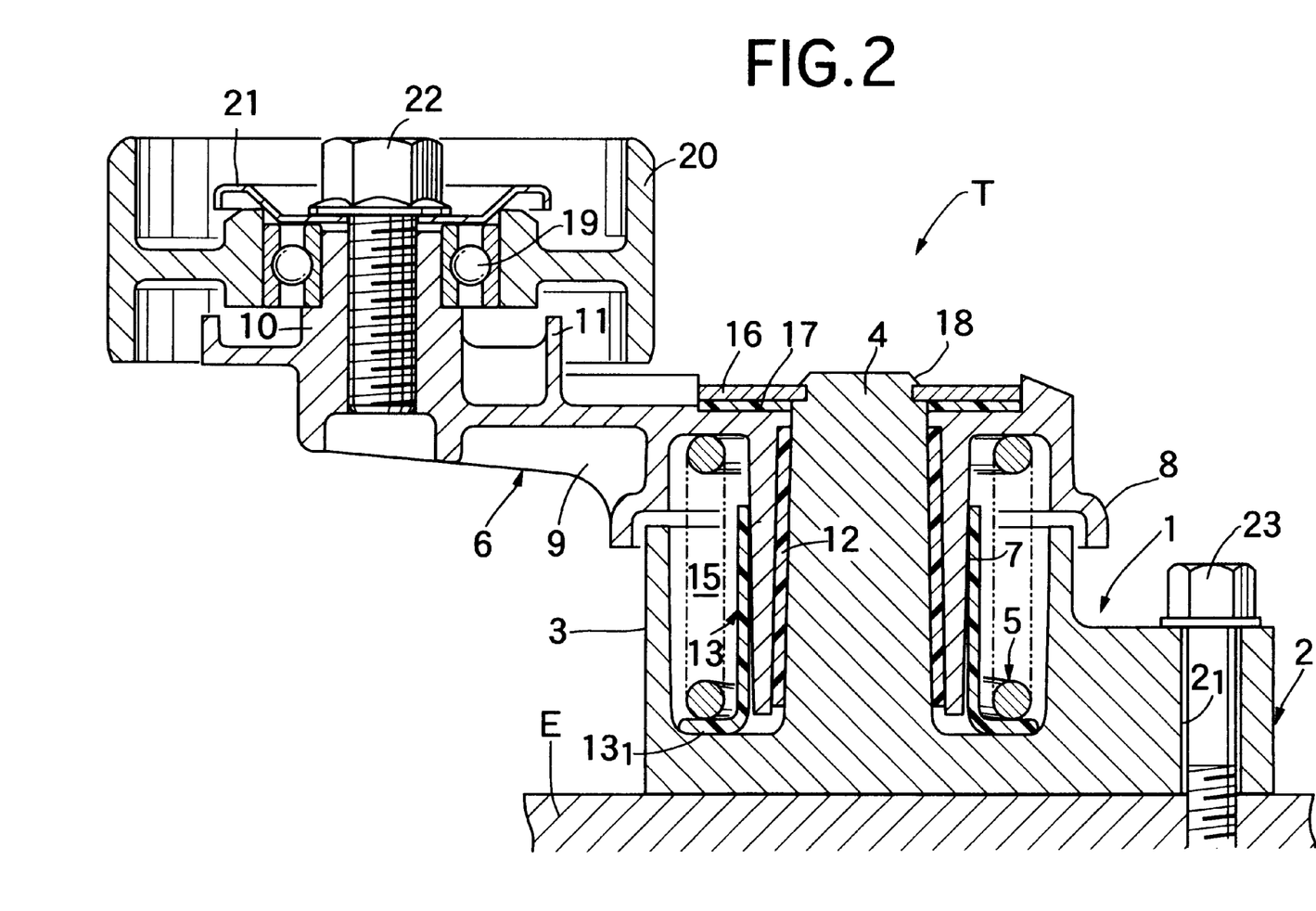
FIG. 2 is a sectional view taken along a line 2—2 in FIG. 1.
Figure 3:
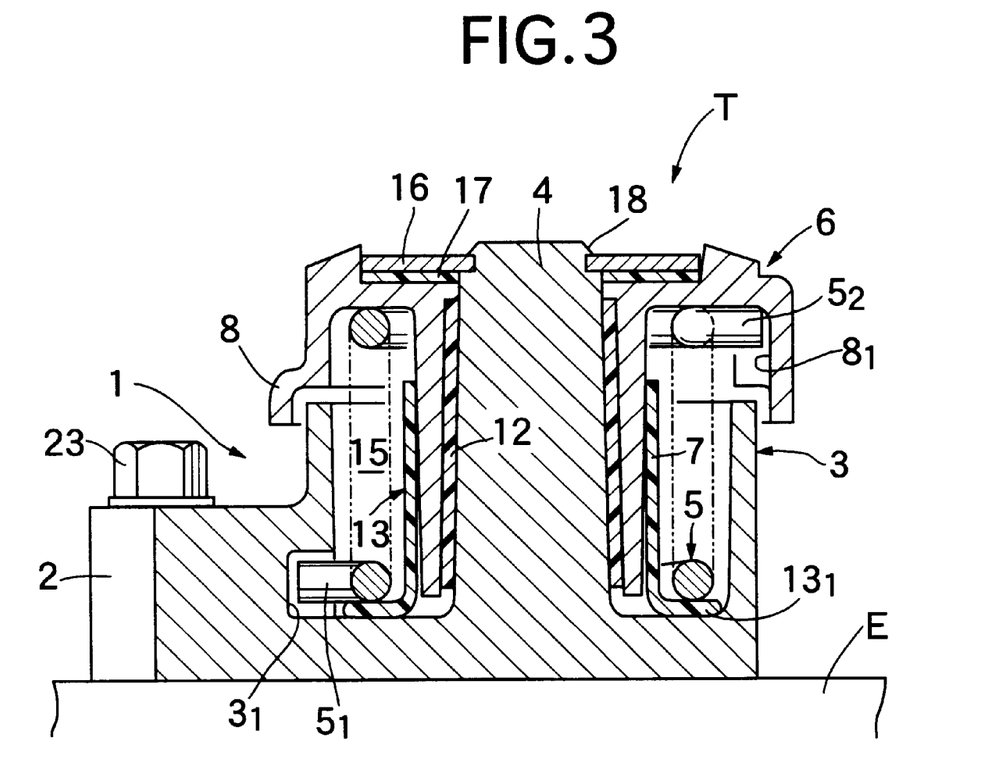
FIG. 3 is a sectional view taken along a line 3—3 in FIG. 1.

As shown in FIGS. 1 to 3, an auto-tensioner T for regulating the tension of an endless belt B, which is adapted to transmit the driving force of a crankshaft for an automobile to auxiliaries such as a generator, includes a base member 1 which is fixed to an engine body E by two bolts 23. The base member 1 includes a substantially triangular mounting portion 2 which abuts against a mounting seat of the engine body E, a closed end cylindrical stationary peripheral wall 3 extends from the mounting portion 2, and an inner shaft 4 extends from the mounting portion 2 along an axis of the stationary peripheral wall 3. Two bolt bores $2_1$, into which the two bolts 23 are inserted, are defined in opposite ends of the mounting portion 2. An engage portion $3_1$ is recessed in an inner periphery of a bottom surface of the stationary peripheral wall 3, and is engaged by a folded portion $5_1$ which is formed by folding a lower end of a coiled torsion spring 5 (which will be described hereinafter) radially outwards.

An arm member 6 pivotally supported on the base member 1 for swinging movement, includes an outer shell 7 which is rotatably fitted over an outer periphery of the inner shaft 4 of the base member 1. A closed end movable peripheral wall 8 surrounds an outer periphery of the outer shell 7, and an arm body 9 extends radially outwards from the movable peripheral wall 8. A pulley shaft 10 projects from a radially outer end of the arm body 9, and a peripheral wall 11 coaxially surrounds an outer periphery of the pulley shaft 10.

When the outer shell 7 of the arm member 6 is pivotally supported on the inner shaft 4 of the base member 1, an insert bearing 12 made in a cylindrical shape of a synthetic resin, is interposed between an outer peripheral surface of the inner shaft 4 and an inner peripheral surface of the outer shell 7, and a cylindrical shaped, spring support 13 made of a synthetic resin is fitted over an outer peripheral surface of the outer shell 7.

A spring 5 is accommodated in a spring accommodating space 15 which is defined between an outer periphery of the spring support 13 and inner peripheries of the stationary and movable peripheral walls 3 and 8, so that the folded portion $5_1$ at a lower end of the spring 5 engages the engage portion $3_1$ of the stationary peripheral wall 3, and a folded portion $5_2$ at an upper end of the spring 5 engages an engage portion $8_1$ of the movable peripheral wall 8. At this time, the lower end of the spring 5 urges a flange portion $13_1$ formed at a lower end of the spring support 13, against a bottom surface of the spring accommodating space 15, thereby inhibiting the rotation of the spring support 13 relative to the base member 1.

A metal washer 16 and a resin washer 17 are fixed, in a superposed relation to each other, to an upper end of the inner shaft 4 protruding upwards from the base member 1 by caulking. In this state, a predetermined compression load and a predetermined torsion load are provided to the spring 5.

A tension pulley 20 is rotatably carried on the pulley shaft 10 of the arm member 6 through a ball bearing 19, and fixed by a bolt 22 through a dust preventing washer 21 to prevent the deposition of dusts onto the ball bearing 19. The peripheral wall 11 surrounding the outer periphery of the pulley shaft 10 is loosely fitted in a recess provided in a radially intermediate portion of the tension pulley 20, to further prevent the deposition of dusts onto the ball bearing 19.

Each of the base member 1 and the arm member 6 is made of an aluminum alloy by die casting. Only the inner peripheral surface of the outer shell 7 in sliding contact with an outer peripheral surface of the insert bearing 12 of the base member 1 is subjected to the regulation of the surface roughness degree by a shot peening. In this embodiment, the surface roughness degree is defined by an arithmetically averaged roughness Ra and a maximum height Ry.

Figure 4:
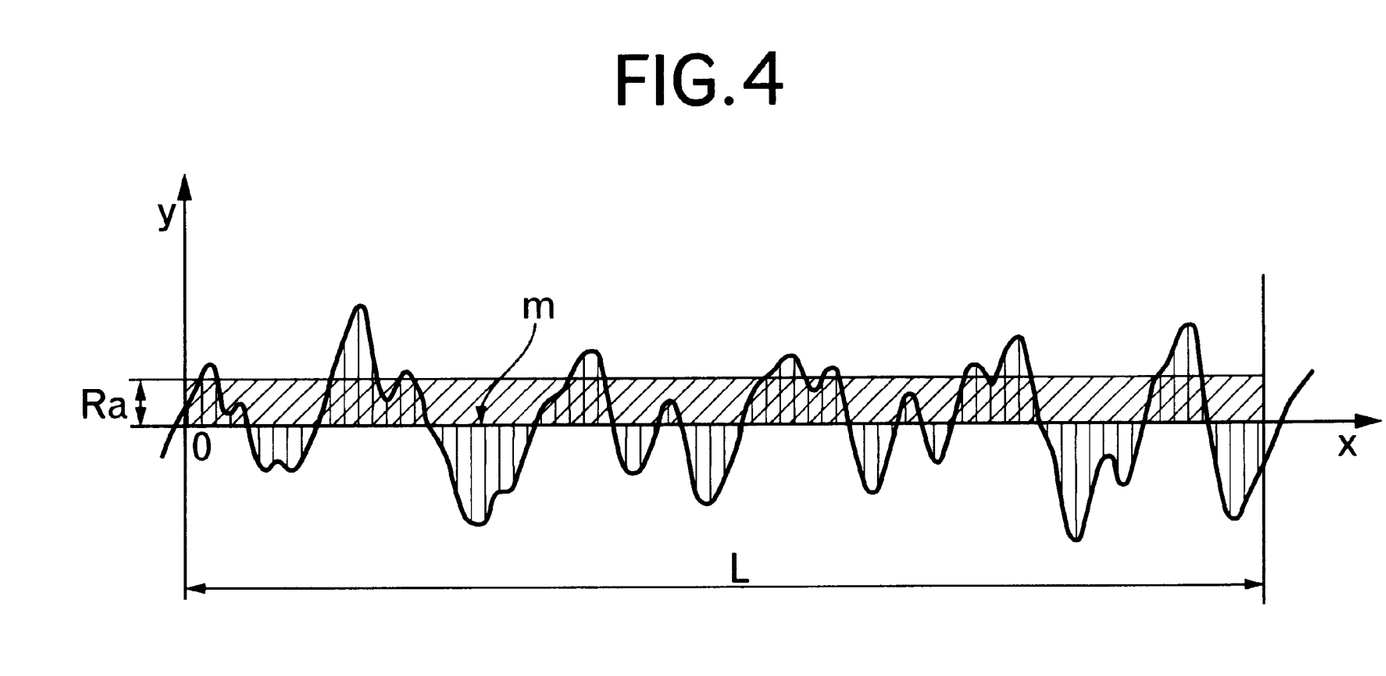
FIG. 4 is a diagram for explaining the definition of an arithmetically averaged roughness Ra.

FIG. 4 shows the definition of the arithmetically averaged roughness Ra, wherein an x-axis is taken in a direction of an average line m of a curve of roughness of a surface, and a y-axis is taken in a direction perpendicular to the x-axis, whereby the curve of roughness is represented by y=f(x). A predetermined reference length L is taken in the direction of x-axis, and the arithmetically averaged roughness Ra is defined as an average value of |f(x)| within a range of the reference length L.

$$Ra = \frac{1}{L}\int_0^L |f(x)|dx$$

Figure 5:
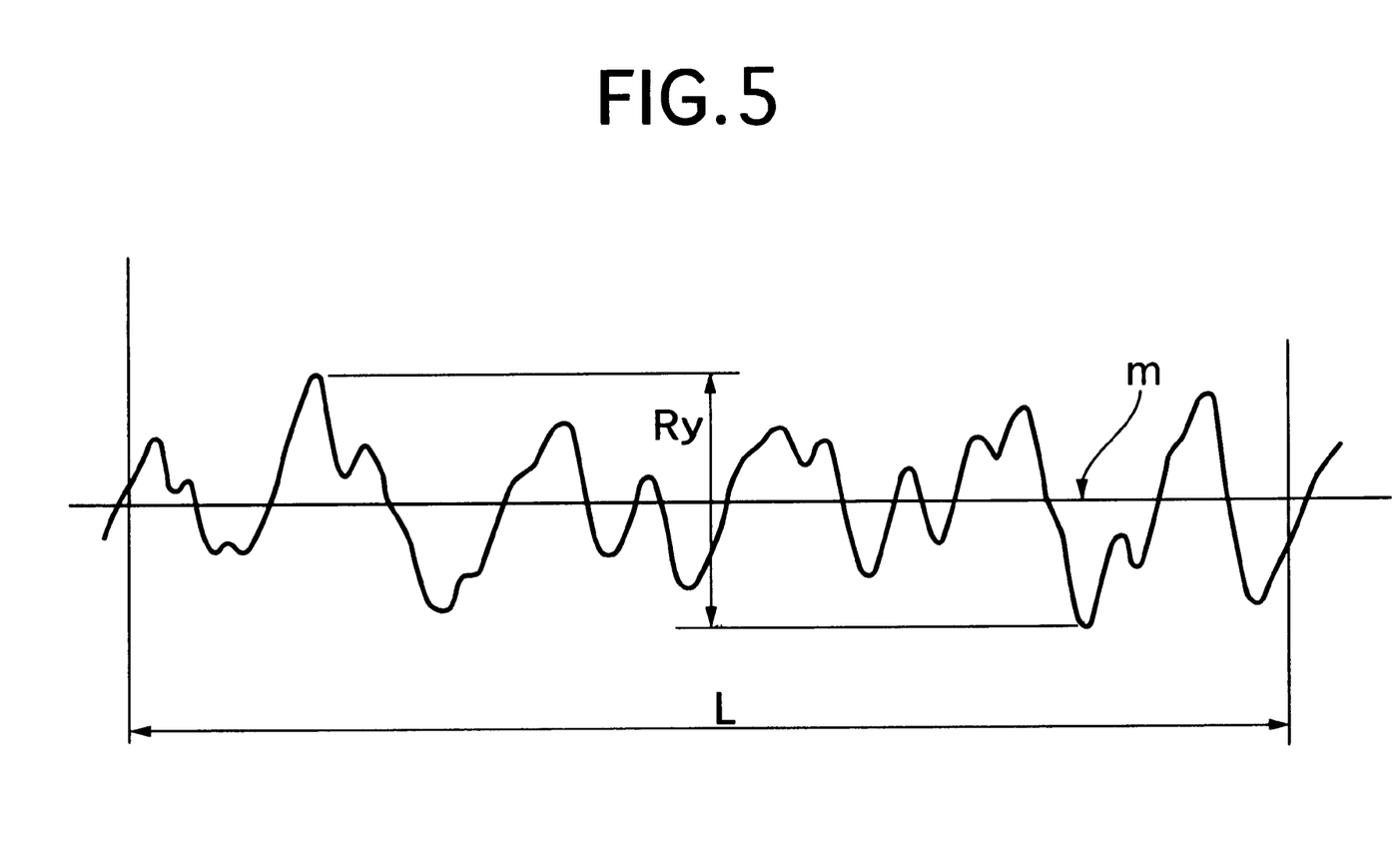
FIG. 5 is a diagram for explaining the definition of a maximum height Ry.

FIG. 5 shows the definition of the maximum height Ry, wherein a reference length L is taken in the direction of the average line m of the curve of roughness of the subject surface, whereby the maximum height Ry is defined as a distance between a crest line and a valley bottom line within a range of the reference length L.

The inner peripheral surface of the outer shell 7 as cast, had an arithmetically averaged roughness Ra of $0.5\times10^{-6}$ m, and a maximum height Ry of $5\times10^{-6}$ m. This inner peripheral surface was subjected to a shot peening for 5 minutes, which comprises blowing of steel balls having a diameter of 1 mm under an injection pressure of 6 kg/m$^2$, and as a result, the arithmetically averaged roughness Ra was increased from $0.5\times10^{-6}$ m before the shot peening to $5\times10^{-6}$ m, and the maximum height Ry was also increased from $5\times10^{-6}$ m before the shot peening to $30\times10^{-6}$ m.

The operation of the embodiment of the present invention having the above-described arrangement will be described below.

The arm member 6 of the auto-tensioner T is swingable in a range from a to c in FIG. 1. The arm member 6 is at a position a under the action of a resilient force of the spring 5 when in a free state in which it does not abut against the endless belt B, and the arm member 6 is swung to a position b against the resilient force of the spring 5 when in a service state in which the tension of the endless belt B acts thereon.

When the tension is further increased, the arm member 6 can be swung to a position c which is a limit position. When the tension of the endless belt B is changed during operation of the engine, the arm member 6 is swung following the change in tension. In this case, the swinging movement of the arm member 6 is limited by a friction force generated between the outer peripheral surface of the insert bearing 12 and the inner peripheral surface of the outer shell 7.

Now, when the inner peripheral surface of the outer shell 7 and the outer peripheral surface of the insert bearing 12 are brought into sliding contact with each other with the swinging movement of the arm member 6, the heat radiation effect is enhanced to suppress the rise of the temperature of the sliding portions of the outer shell 7 and the insert bearing 12, because the surface area of the inner peripheral surface of the outer shell 7 has been increased prior to assembly of the auto-tensioner as a new article, by the shot peening. When the auto-tensioner has been used over a long period time, the resin of the worn insert bearing 12 enters the recess in the inner peripheral surface of the outer shell, whereby the sliding characteristic is enhanced to suppress the rise of temperature of the outer shell 7 and the insert bearing 12.

Figure 6:
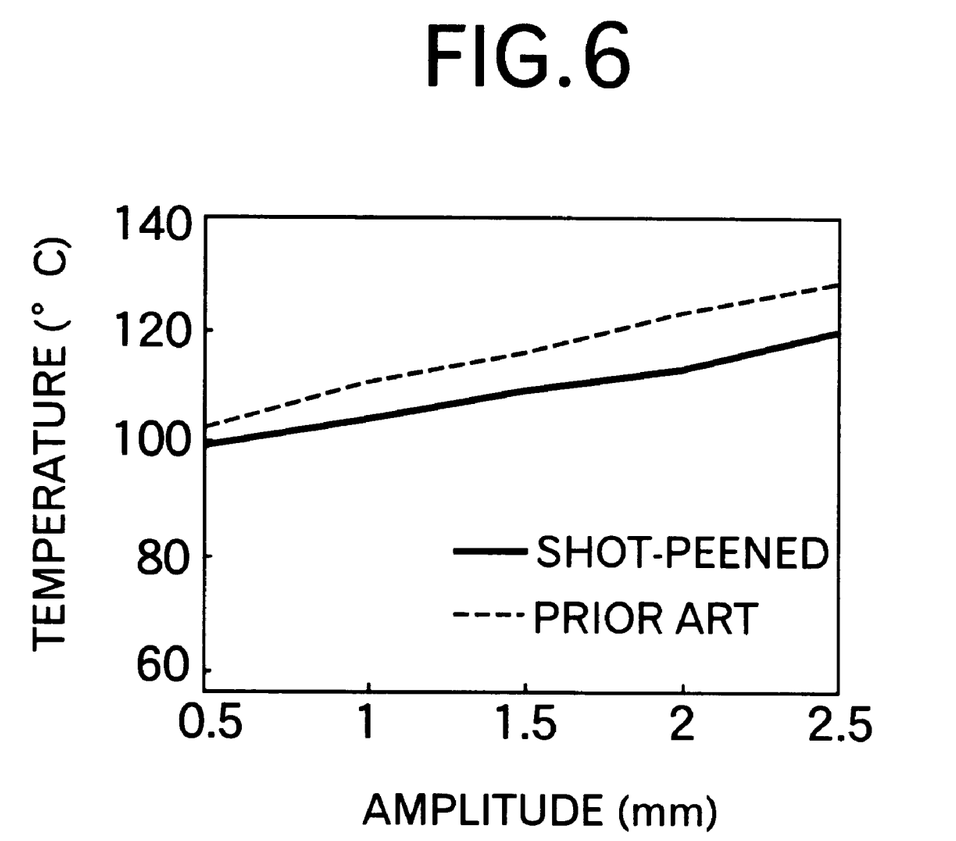
FIG. 6 is a graph showing the relationship between the amplitude of an arm member and the temperature of a sliding portion.
Figure 7:
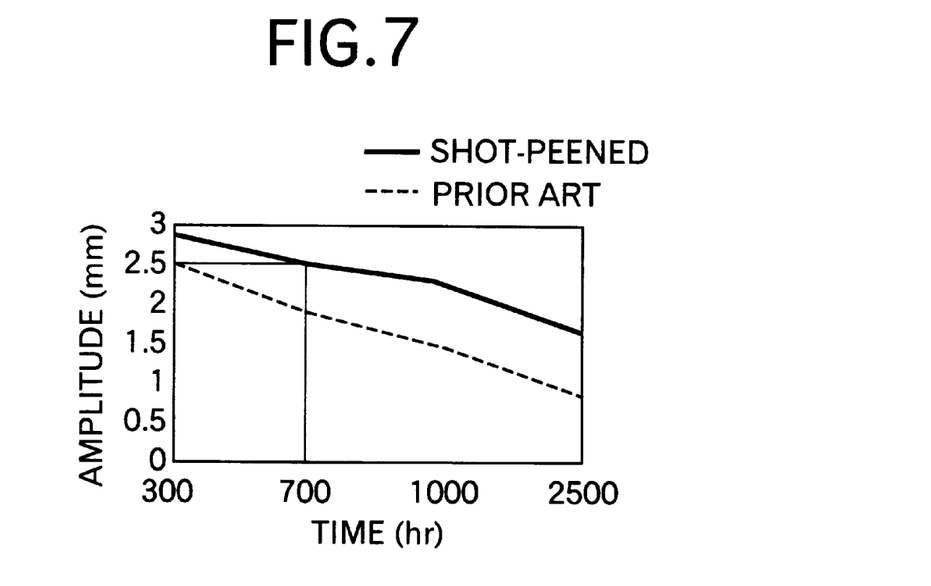
FIG. 7 is a graph showing the relationship between the amplitude of an arm member and the endurance time of an insert bearing.

As is apparent from FIG. 6, the temperature of the sliding portion when the arm member 6 is swung at various amplitudes, is lower in the auto-tensioner made through the shot peening according to the present invention than that in a conventional auto-tensioner made without the shot peening. As a result, the rise of the temperature of the insert bearing 12 made of synthetic resin is suppressed and therefore, scorching, hardening and cracking of the insert bearing 12 can be prevented to prolong the life of the auto-tensioner. When the arm member 6 is swung, for example, at an amplitude of 2.5 mm, as shown in FIG. 7, scorching, hardening, cracking or the like of the insert bearing 12 in the conventional auto-tensioner are produced in 300 hours to the end of the life of the bearing, whereas the life of the bearing according to the present invention is prolonged to 700 hours.

Figure 8:
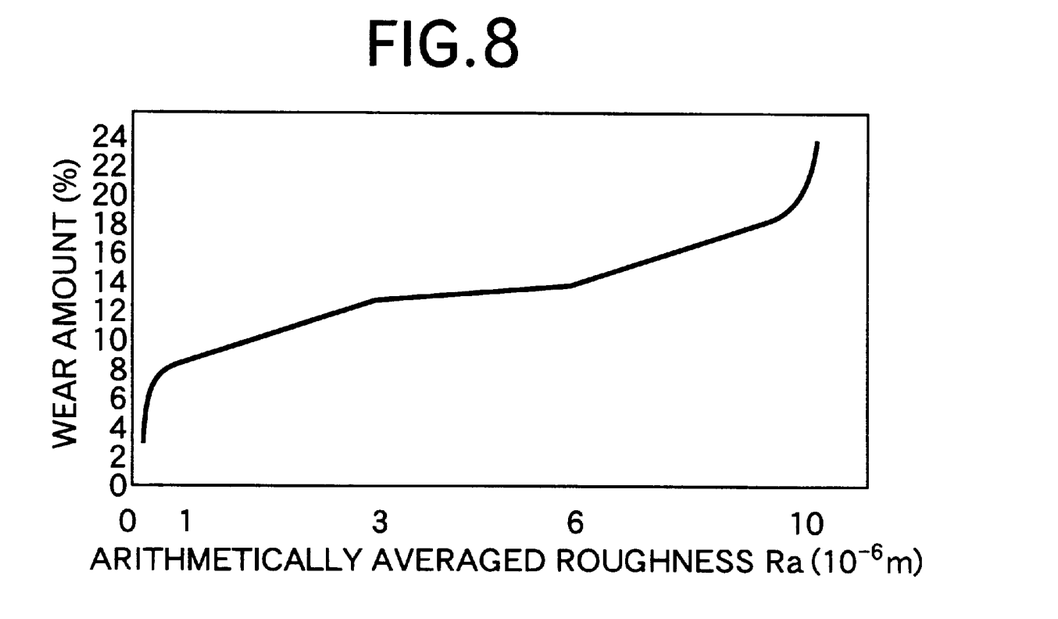
FIG. 8 is a graph showing the relationship between the arithmetically averaged roughness of an outer shell and the wear amount of the insert bearing.

As is apparent from FIG. 8, if the arithmetically averaged roughness Ra of the inner peripheral surface of the outer shell 7 exceeds $10 \times 10^{-6}$ m due to the shot peening, the wear amount of the insert bearing 12 exceeds 18% which is an acceptable value, and there is a possibility that the life is shortened. If the arithmetically averaged roughness Ra is smaller than $1 \times 10^{-6}$ m, the effect provided by the shot peening cannot be exhibited sufficiently. From the foregoing, it is appropriate that to ensure a target durability of the insert bearing 12, the arithmetically averaged roughness Ra of the inner peripheral surface of the outer shell 7 is set in a range of $1 \times 10^{-6}$ m$\leq$Ra$\leq 10 \times 10^{-6}$ m, and the maximum height Ry is set in a range of Ry$\leq 60 \times 10^{-6}$ m.

The auto-tensioner T used for the endless belt B for driving auxiliaries in an automobile has been illustrated in the above embodiment, but the present invention is applicable to an endless belt B used in any other application. The endless transmitting band is not limited to the endless belt B and may be an endless chain. In this case, the rotor is a tension sprocket rather than the tension pulley 20.

As discussed above, according to the present invention, the heat radiating effect can be enhanced by an increase in surface area of the inner peripheral surface of the outer shell prior to assembly, by regulating the surface roughness (the arithmetically averaged roughness Ra and a maximum height Ry) of the inner peripheral surface of the outer shell to a predetermined value. During use, the resin of the braking member is allowed to enter the recess in the inner peripheral surface of the outer shell, thereby enabling the sliding characteristic to be enhanced. Thus, it is possible to inhibit the generation of a heat due to the sliding movement between the inner peripheral surface of the outer shell and the outer peripheral surface of the braking member, to prevent scorching, hardening and cracking of the braking member due to a rise in the temperature.

The sliding characteristic of the base material is further enhanced by incorporating a lubricating material selected from a fluorine containing resin and a molybdenum containing resin into the base material selected from 46-nylon and 66-nylon which provide an excellent sliding characteristic. Also the sliding characteristic of the outer shell is enhanced by the fact that the resin of the braking member enters the recess in the inner peripheral surface of the outer shell. Moreover, the strength of the base material can be enhanced by mixing reinforcing material selected from glass fiber, carbon fiber, KEVLAR (para-aramid) fiber and the like.

The surface roughness of the inner peripheral surface of the outer shell made of an aluminum alloy, can be simply regulated to the predetermined value.

The heat radiating effect can be enhanced by an increase in surface area of the inner peripheral surface prior to assembly, by increasing the surface roughness degree of the inner peripheral surface of the outer shell by the shot peening. Thereafter, the resin of the braking member is allowed to enter the recess in the inner peripheral surface of the outer shell, thereby enabling the sliding characteristic to be enhanced. Thus, it is possible to inhibit the generation of a heat due to the sliding movement between the inner peripheral surface of the outer shell and the outer peripheral surface of the braking member, to prevent scorching, hardening and cracking of the braking member due to the rise of temperature.

Although the embodiment of the present invention has been described in detail, it will be understood that the present invention is not limited to the above-described embodiment, and various modifications may be made without departing from the subject matter of the present invention.

What is claimed is:

1. An auto-tensioner for applying tension to an endless transmitting band, comprising:

a base member having an inner shaft;

a braking member formed of a resin and fitted over an outer peripheral surface of said inner shaft;

an arm member made of an aluminum material and manufactured by die casting, the arm member having an outer shell fitted over an outer peripheral surface of said braking member;

a rotary member mounted on said arm member; and a resilient member biases said arm member in a direction to bring said rotary member into pressure contact with said endless transmitting band, a swinging movement of the arm member is damped by a friction force generated between the outer peripheral surface of said braking member and an inner peripheral surface of said outer shell, wherein the inner surface of said outer shell of the arm member in sliding contact with the outer peripheral surface of said braking member is shot peened prior to assembly.

2. An auto-tensioner according to claim 1, wherein an arithmetically averaged roughness Ra and a maximum projection Ry derived from the inner peripheral surface of said outer shell in sliding contact with the outer peripheral surface of said braking member being shot peened are in ranges of $1 \times 10^{-6} m \leq Ra \leq 10 \times 10^{-6} m$ and $Ry \leq 60 \times 10^{-6} m$.

3. An auto-tensioner according to claim 1, wherein said braking member is a mixture comprising at least one base material selected from 46-nylon and 66-nylon, at least one reinforcing material selected from glass fiber, carbon fiber and Para-aramid fiber, and at least one lubricating material selected from a fluorine containing resin and a molybdenum containing resin.

4. An auto-tensioner according to claim 1, wherein said braking member is cylindrical.

* * * * *